United States Patent [19]
White

[11] 4,322,940
[45] Apr. 6, 1982

[54] HARVESTING MACHINE FOR MACADEMIA NUTS

[76] Inventor: Henry J. White, White Sands Village, 77-6469 Alii Dr., Kailua-Kona, Hi. 96740

[21] Appl. No.: 234,475

[22] Filed: Feb. 17, 1981

[51] Int. Cl.$^3$ ............................................. A01D 46/00
[52] U.S. Cl. ........................... 56/328 R; 56/DIG. 8; 56/12.9
[58] Field of Search ............... 56/328 R, DIG. 8, 12.8, 56/12.9, 13.1, 13.2, 13.3, 13.4

[56] References Cited

U.S. PATENT DOCUMENTS

| | | | |
|---|---|---|---|
| 3,568,422 | 3/1971 | Thies | 56/328 R |
| 3,601,963 | 8/1971 | Rauth | 56/328 R |
| 3,693,331 | 9/1972 | Richter et al. | 56/328 R |
| 4,085,973 | 4/1978 | Payne | 56/328 R |

*Primary Examiner*—Robert A. Hafer
*Attorney, Agent, or Firm*—Francis D. Thomas, Jr.; Francis B. Francois

[57] ABSTRACT

A main shroud is open at the bottom, and carries a housing on the upper end thereof. An annular director ring is mounted to extend in spaced relationship about the bottom of the main shroud, and a vertical shaft extends upwardly through the shroud and the housing and is connected with a power unit. An upper blower fan is mounted on the shaft within the housing, and generates an upward flow of air through the harvester. An impeller is mounted on the lower end of the shaft, and includes a mounting ring having external blades thereon which project into the annular space defined by the director ring. The impeller external blades generate a downward flow of air through the annular space, which is directed downwardly and inwardly to dislodge macademia nuts found in ground crevices, so they can be entrained in the upward air flow and discharged from the harvester.

13 Claims, 11 Drawing Figures

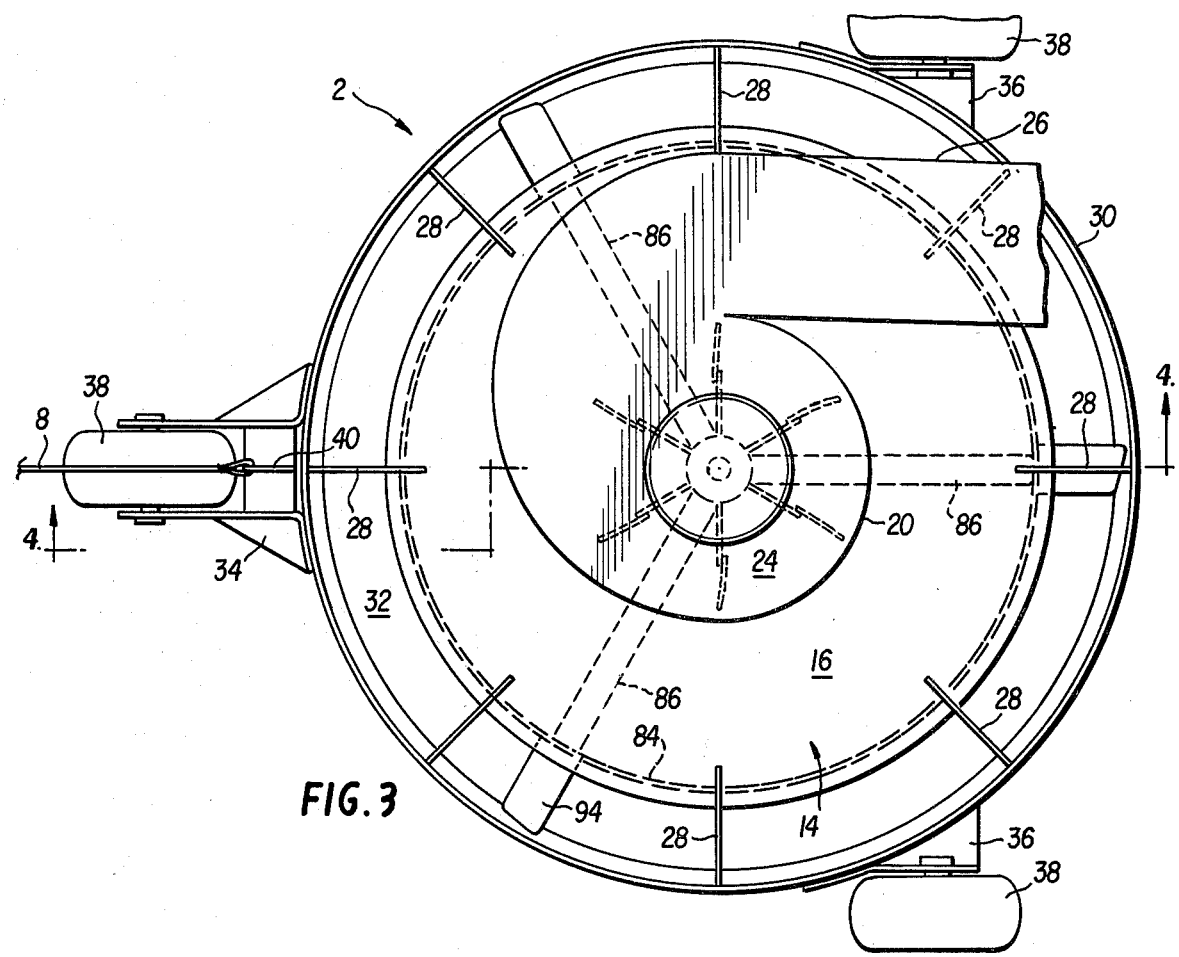
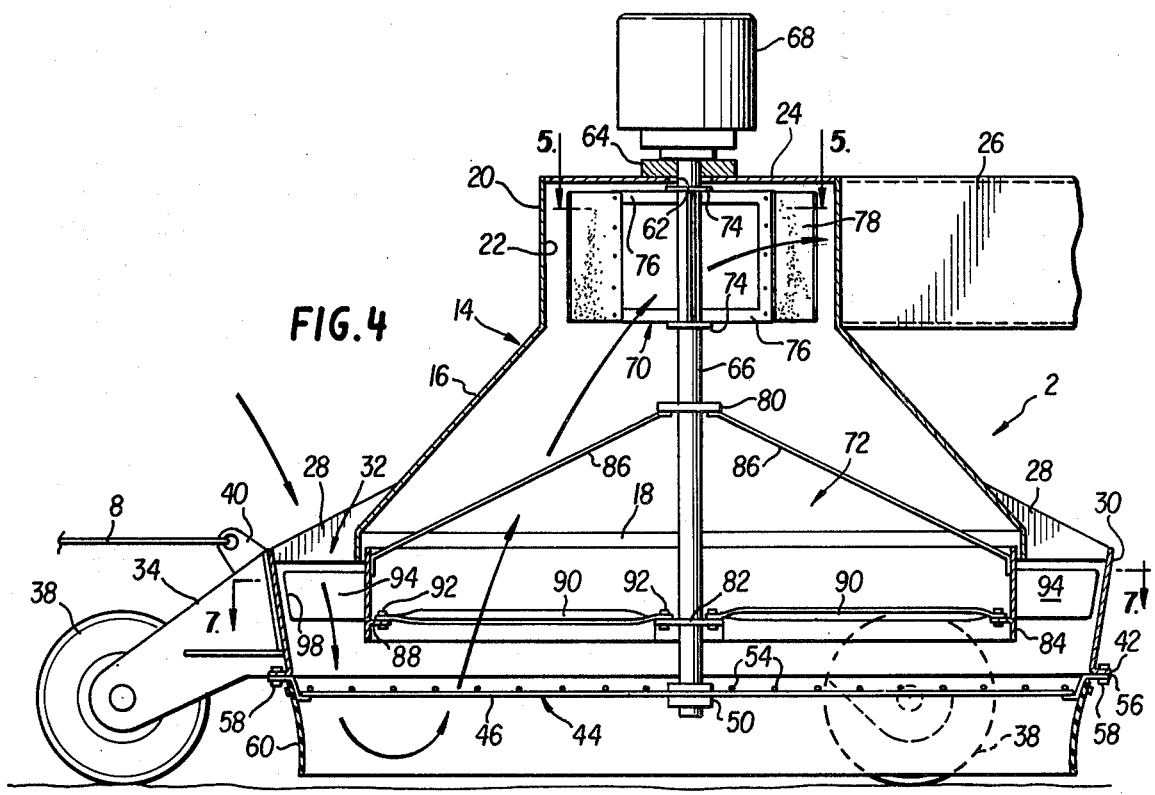

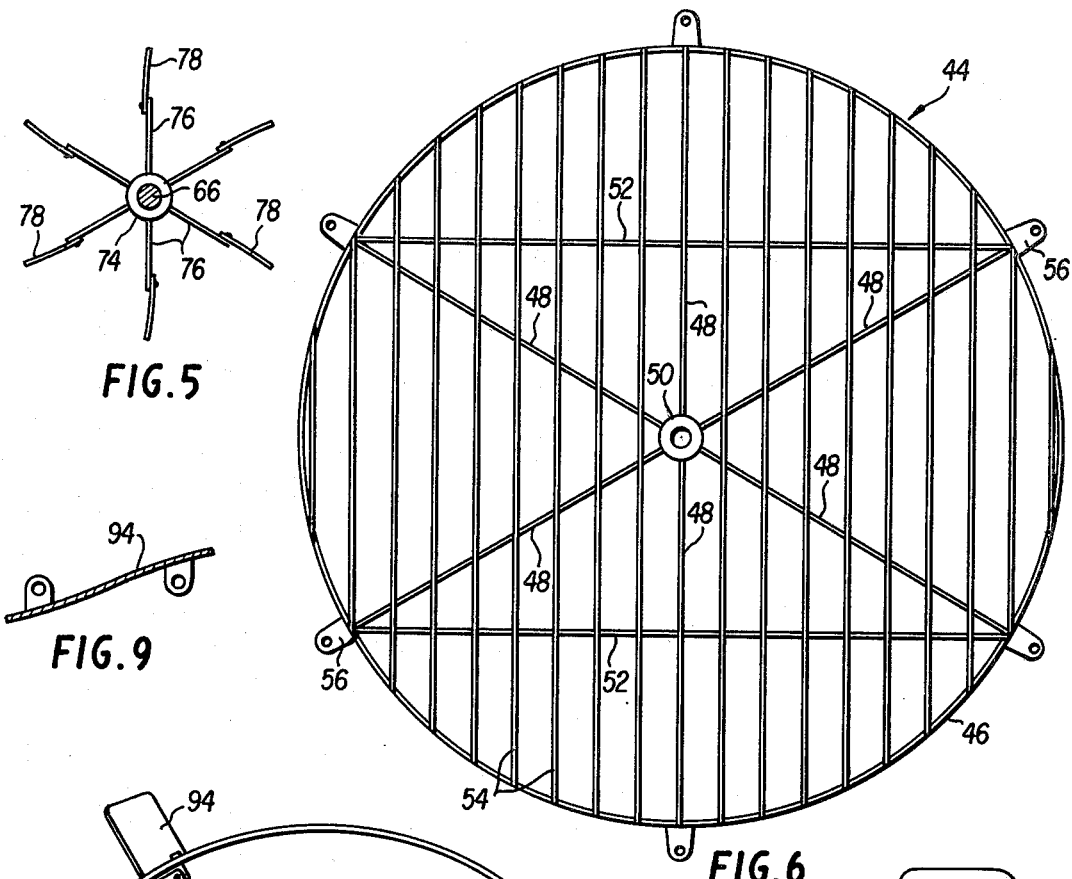
FIG.5
FIG.9
FIG.6
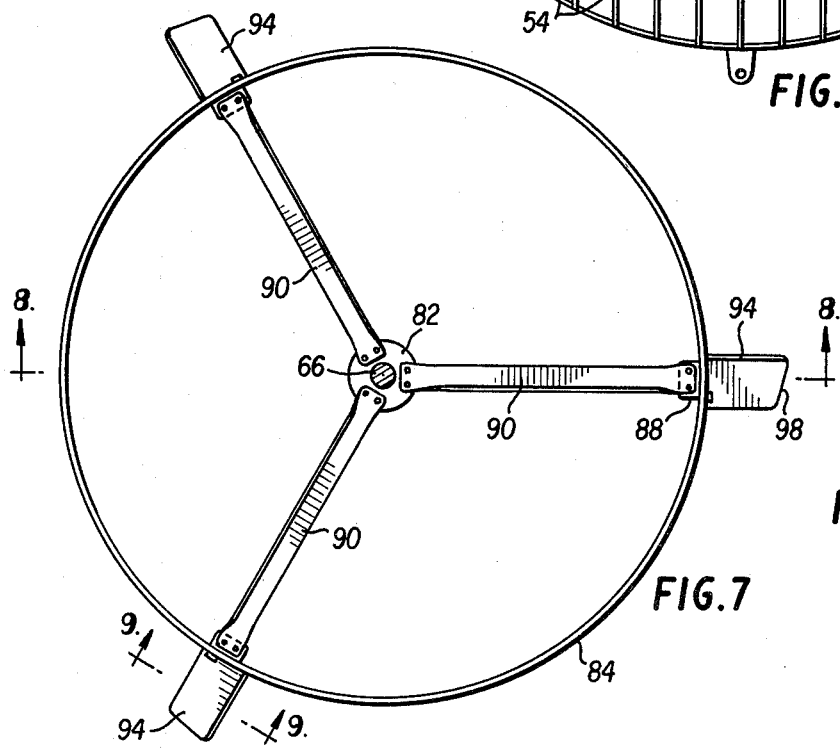
FIG.7
FIG.10
FIG.11
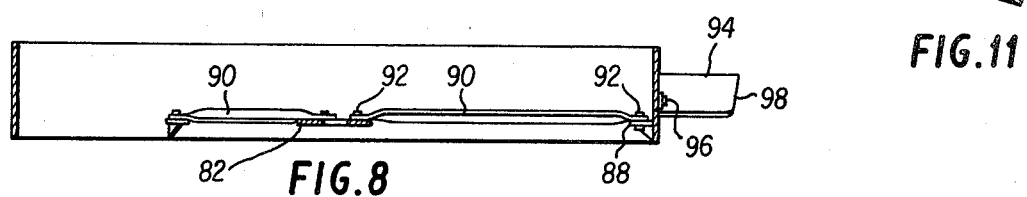
FIG.8

HARVESTING MACHINE FOR MACADEMIA NUTS

TECHNICAL FIELD OF THE INVENTION

This invention relates generally to a machine for use in picking macadamia nuts from the ground, where they earlier have fallen from macadamia trees. More particularly, it relates to a harvesting machine equipped to dislodge the fallen macadamia nuts from rocks and debris and from crevices found on the ground surface where they rest, and to then gather the macadamia nuts for later processing and distribution.

BACKGROUND OF THE INVENTION

The popular macadamia nut grows on macadamia trees usually located on rough and rocky volcanic soil. The surface of the ground will often have many small crevices and be covered with rocks and other debris. When the macadamia nuts fall from the trees, they often enter into the crevices of the ground and become mixed with the rocks and debris, making their harvest unusually difficult.

In the past, because of the difficulty in how the macadamia nuts lie on the ground, harvesting has usually required extensive manual labor. This has limited the quantity of nuts harvested and contributes to the cost of the macadamia nut meat when it is eventually marketed. There is need for a harvesting machine capable of overcoming the unusual harvesting problems associated with the macadamia nut, and this invention addresses that need.

There have been nut harvesting machines devised in the past, but none is capable of successfully gathering the macadamia nut. Typical of the nut harvesting machines now known are those shown in U.S. Pat. Nos. 3,568,422; 3,693,331; and 4,194,346. In the first of these patents, both nuts and foreign material are ingested into a hood-like assembly through a narrow slot at the front thereof, the ingestion occurring because of a fan mounted on the assembly. The fan functions to discharge the debris from within the assembly, while the heavier nuts are accumulated within a tray. The machine is not capable of successfully gathering macadamia nuts because of its inability to dislodge them from crevices, and for other reasons.

The nut harvester of U.S. Pat. No. 3,693,331 utilizes a blower to gather debris and pass it to discharge, and separate air jets to disturb the nuts where they lie. But again, the machine is not suited to the terrain where macadamia nuts are found. Similarly, the blower arrangement and other elements of the harvester found in U.S. Pat. No. 4,194,346 are not capable of effectively gathering macadamia nuts.

The harvester of the present invention is specifically designed to meet the unique conditions involved in gathering macadamia nuts, and functions to allow their effective harvesting by machine.

BRIEF SUMMARY OF THE INVENTION

The harvester of the invention is designed to first dislodge and lift the macadamia nuts from the crevices of the rocky ground in which they may lie, after which the nuts are gathered. Both of these actions are accomplished by utilizing air flows that are generated and directed in a unique manner.

The harvester includes a main shroud that is open on the bottom and which has an annular air flow director ring mounted to extend about its lower end in spaced relationship thereto. The director ring forms an annular passage with the lower end of the shroud that is open at both its upper and lower ends, and the ring is angled to direct an annular flow of air drawn downwardly through the passage so that it flows inwardly and downwardly for dislodging macadamia nuts and accompanying debris from crevices in the ground. The upper end of the shroud terminates in a spiral-shaped housing defining a cavity that contains an upper blower fan, the cavity exiting to a conveyor belt, bag or other device for collecting the gathered macadamia nuts. The open bottom of the shroud is covered with a grill having openings sized to admit macadamia nuts and small rocks and debris of like or smaller size, but which will exclude larger volcanic rocks and other objects that might damage the dynamic components of the harvester.

A power shaft extends vertically through the main shroud, and is connected to a power unit at its upper end. This power shaft carries the upper blower fan and a specially configured impeller mounted just above the grill. The impeller includes a large diameter mounting ring having spaced blades mounted on the exterior thereof angled to direct air downwardly when the mounting ring is rotated by the power shaft, the external impeller blades being positioned to extend into the annular passage formed by the detector ring.

When the impeller is rotated, the external impeller blades draw air downwardly through the annular passage about the lower end of the central shroud. This air flow is annular, and is directed downwardly and inwardly about the diameter of the shroud by the director ring to impact upon, loosen and dislodge macadamia nuts lying on the ground or in crevices. After dislodging the macadamia nuts, the air flow reflects from the ground surface up into the shroud, entraining and carrying along the freed macadamia nuts. Usually, small volcanic rocks and other lightweight debris travel with the macadamia nuts as they pass through the grill to enter the shroud.

With the power shaft rotating, the upper blower fan is in operation and it creates a flow of air upwardly through the grill and the interior of the shroud, and then out through the discharge of the spiral-shaped housing. This air flow acts to capture the macadamia nuts and other debris entering the harvester through the grill, and moves such material to waiting conveyor belts or containers.

The mounting ring is usually also fitted with internal, spaced radial blades arranged to generate an upward air flow that helps to move the macadamia nuts. In some instances, these radial internal blades are not required to move the nuts and related material.

Once the gathered macadamia nuts have exited from the spiral-shaped cavity and been collected, they are taken to a processing location. Any accumulated debris will then be separated from the nuts, and the nut meats will be processed for distribution.

The unique arrangement of the upper blower fan and the impeller of the invention functions to effectively collect macadamia nuts from rough, crevice-filled terrain. The annular downward and inward air flow extending completely about the central shroud is the key to the collecting ability of the harvester, and the upper blower fan then captures the macadamia nuts while they are in effect suspended in air and moves them upwardly through and out of the shroud. The result is an effective machine for harvesting macadamia nuts, and indeed any other kind of nuts that might be found in similar terrain conditions.

It is the principal object of the present invention to provide a harvester that can successfully gather macademia nuts from the rough, creviced and often debris-laden terrain in which they are found after having fallen from the tree, and deliver the gathered nuts into containers or onto a conveyor belt.

A further object is to provide a harvester arranged to generate a downwardly and inwardly directed annular air flow capable of loosening macadamia nuts and dislodging them from the ground crevices and the like.

Yet another object is to provide a harvester which is compact in construction, and which utilizes a minimum of dynamic components.

Still another object is to provide an impeller arrangement that can generate both an annular gathering downward air flow, and an upward air flow for moving collected macadamia nuts toward a discharge opening.

Other objects and many of the attendant advantages of the present invention will become readily apparent from the following Description of the Preferred Embodiments, when taken in conjunction with the accompanying drawings.

BRIEF DESCRIPTION OF THE DRAWINGS

FIG. 3 is an enlarged top, plan view of the harvester of FIG. 2 and shows, in particular, the spiral-shaped housing mounted on the central shroud, with the impeller and its blades being shown in broken lines;

FIG. 4 is a vertical sectional view taken along the line 4—4 in FIG. 3, and shows the relationships between the annular director ring, the power shaft, the upper blower fan, and the impeller;

FIG. 5 is a horizontal sectional view taken on the line 5—5 of FIG. 4, showing the upper blower fan;

FIG. 6 is a bottom plan view of the grill shown in FIG. 4;

FIG. 7 is a sectional view of the impeller, taken generally on the line 7—7 of FIG. 4;

FIG. 8 is a vertical sectional view taken on the line 8—8 of FIG. 7, showing details of the impeller's construction;

FIG. 9 is an enlarged, sectional view taken on the line 9—9 in FIG. 7, showing the configuration of one of the external impeller blades;

FIG. 10 is an enlarged, broken plan view of one of the internal impeller blades; and FIG. 11 is a cross-sectional view taken on the line 11—11 of FIG. 10.

DESCRIPTION OF THE PREFERRED EMBODIMENTS

Figure 1:
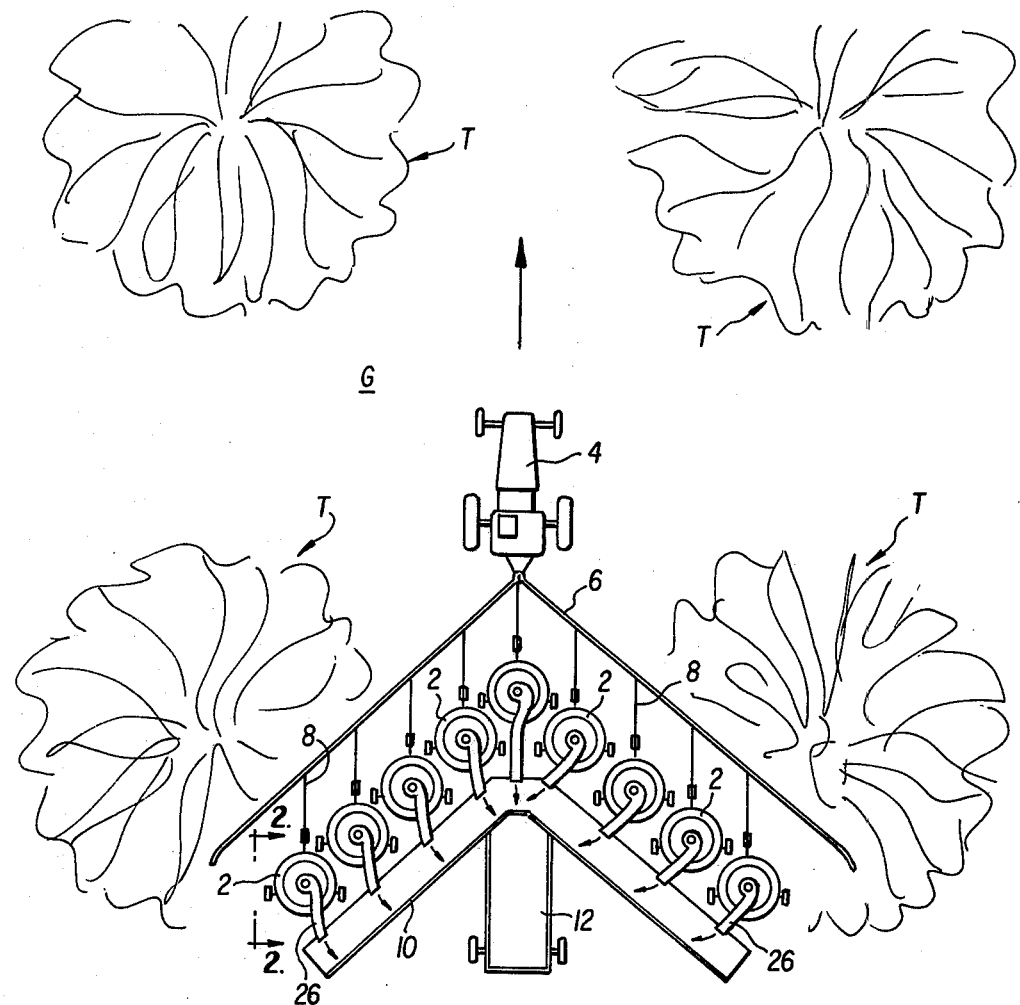
FIG. 1 is a diagrammatic view showing a number of the harvesters of the present invention being towed across ground upon which are located macadamia trees, and illustrates a typical arrangement for utilizing the machine of the invention.
Figure 2:
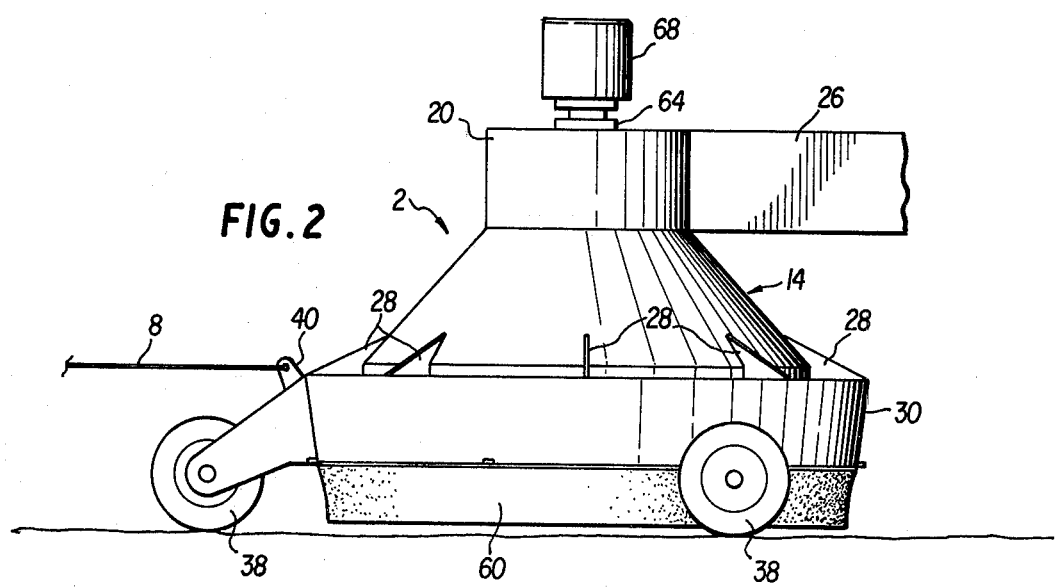
FIG. 2 is a side elevational view of one of the harvesters of FIG. 1.

Referring now to FIG. 1 of the drawings, several of the harvesters 2 of the invention are shown being drawn in formation across the surface G of terrain having a purality of macadamia nut trees T growing thereon. While the harvester 2 of the invention can be used independently, normally a number of them will be operated at the same time, as shown in FIG. 1.

In FIG. 1, a tractor 4 is shown connected to a V-shaped implement frame 6, to which the harvesters 2 are connected by cables or chains 8, the harvesters being arrayed in a slightly overlapping formation. Mounted behind the harvesters 2 on the implement frame 6 is a collector conveyor 10, which receives the gathered macadamia nuts and any accompanying small rocks and debris and deposits such in a bin 12. The conveyor 10 is of conventional construction, and is not considered to be a part of the present invention.

In some instances, it may be desirable to utilize collection bags for each harvester 2, or some other collection arrangement.

Each of the harvesters 2 includes a main shroud 14 having a generally frusto-conical body portion 16 terminating at its open lower end in a cylindrical portion 18. Mounted on the upper end of each shroud 14 is a spiral-shaped housing 20 containing a cavity 22, the housing 20 including a top wall 24 and having a discharge spout 26 extending therefrom. The lower end of the cavity 22 is open to the interior of the central shroud 14.

A set of spaced, radial mounting plates 28 is connected to the lower end of the central shroud 14, and functions to carry an annular air flow director ring 30 that is spaced from the shroud cylindrical portion 18 to define an annular passage 32. The director ring extends a substantial distance below the bottom of the central shroud 14, and is angled inwardly from top to bottom for directing air flow passing downwardly through the passage 32 inwardly and downwardly to the region beneath the central shroud. Mounted on the exterior of the director ring 30 are front and rear brackets 34 and 36, respectively, for mounting wheels 38 to support the harvester 2 upon the ground and make it mobile. The towing chain or cable 8 is connected to a suitable bracket 40 carried on the front bracket 34 or, if desired, elsewhere on the harvester.

If desired, the wheels 38 and their mounting brackets could be eliminated and, instead, the main shroud 14 could be provided with brackets for mounting it directly on the hitch apparatus of a tractor. Further, the shroud 14 could be mounted with other shrouds on a machine frame designed for this purpose.

The lower edge of the director ring 30 has spaced brackets 42 thereon, which function to connect a grill 44 to the ring. As best shown in FIG. 6, the grill 44 includes a circular supporting ring 46, braced with radial members 48 that extend from a central bearing member 50 to the supporting ring. In addition to the radial braces 48, the grill 44 is also braced with crossbraces 52. A plurality of parallel members 54 extend across the supporting ring 46 and are carried thereby, the spacing between the members 54 being chosen to be just slightly larger than the diameter of the macadamia nuts to be harvested. Attached to the periphery of the grill 44 are spaced brackets 56 arranged to match the brackets 42, and the grill is mounted in position by bolts 58 which pass through the aligned brackets 42 and 56.

The wheels 38 are arranged to support the bottom edge of the director ring 30 and the grill 44 above the surface of the ground upon which the harvester 2 is operated. Under some circumstances, the space between the ground and the director ring 30 can cause operating inefficiencies in that some of the directed annular air flow is dispersed. This condition can be solved by connecting the upper end of an annular skirt 60 of rubber or other flexible material to the brackets 56, or alternatively, to the director ring 30, the flexible skirt thereafter functioning to confine the annular air flow against lateral dispersion and loss.

The top wall 24 of the spiral-shaped housing 20 has an opening 62 therein, and carries a bearing member 64 aligned with the opening and with the bearing member 50. A vertical power shaft 66 is journaled in and supported by the upper and lower bearing members 50 and 64, and the upper end thereof is connected to a suitable power unit 68. The power unit 68 is preferably a hydraulic motor operated from the hydraulic system of the tractor 4, but it can also be an electric motor, or some other type of unit capable of rotating the power shaft 66 at sufficiently high speed.

The power shaft 66 functions to carry and effect rotation of an upper blower fan 70 and an impeller 72, the latter being mounted on the shaft just above the grill 44. Turning to FIGS. 4 and 5, the blower fan 70 is housed in the cavity 22 and includes upper and lower hubs 74 mounted on the power shaft 66 which carry a plurality of U-shaped short, radial rigid frames 76 thereon. Attached to the outer ends of the legs of the U-shaped frames 76 are blades 78 made of rubber or another flexible material, capable of impacting with macadamia nuts, rocks and other debris without substantial damaging effects. The upper blower fan 70 generates an upward air flow through the shroud 14 when the power shaft 66 is rotated, the shaft being rotated in a direction so as to direct material entrained by this air flow outwardly into the discharge conduit 26. The U-shaped frames 76 provide a central opening through which material to be discharged is received.

Mounted on the power shaft 66 beneath the upper blower fan 70 are upper and lower brackets 80 and 82, which function to support a large mounting ring 84 having a diameter slightly less than the internal diameter of the cylindrical shroud portion 18, and which is the main structural element of the impeller 72. Three angle support bars 86 extend from the upper bracket 80 to the mounting ring 84, and provide its major support; the number of support bars 86 utilized can of course be varied. The interior of the mounting ring 84 has spaced brackets 88 thereon, aligned with the lower bracket 80 carried on the power shaft 66. Radial members 90 are connected by bolts or rivets 92 at their opposite ends to the brackets 88 and 80, and give stability to the mounting ring 84. The mounting ring 84 lies close to the lower edge of the shroud 14, and functions as part of the inner wall of the annular passage 32.

The exterior of the mounting ring 84 carries a plurality of externally mounted impeller blades 94 thereon. As shown in FIG. 9, the external impeller blades 94 are mounted by rivets or screws 96 to the mounting ring 84, and are pitched or set at an angle to the horizontal. Referring to FIG. 4, the impeller blades 94 extend outwardly nearly into contact with the director ring 30, and their outer ends 98 are tapered to conform to the inward angle of the director ring. Thus, the external impeller blades 94 extend into the annular passage 32, the director ring 30 extending for a substantial distance below the operating plane of the blades 94. When the power shaft 66 is rotated, the external impeller blades 94 are arranged to create a downward flow of air, which is confined by the inclined director ring 30 on the outside, and by the cylindrical portion 18 of the shroud 16 and the annular mounting ring 84 on the inside.

Returning to the radial members 90, if desired these can be pitched or angled so as to generate an upward air flow into the shroud 14, and this arrangement is shown in the drawings. This additional upward air flow may not always be necessary, but it will help assure entrainment and ingestion of the gathered macadamia nuts, particularly when the nuts are accompanied by an extensive amount of debris.

As shown in FIGS. 7, 8, 10 and 11, the radial members 90 have relatively flat end portions 100, and a central portion 102 that is bent to an angle relative to a horizontal plane. The central portion is pitched or bent so that an upward air flow is generated when the operating shaft 66 is rotated, and thus they constitute internal impeller blades.

When the operating shaft 66 is rotated, the upper blower fan 70 and the radial members or internal impeller blades 90 will both create an upward flow of air through the shroud 14. At the same time, the external impeller blades 98 will establish a downward annular air flow through the annular passage 32. This arrangement of air flow is unique in nut gathering equipment.

In operation, the harvester 2 will be towed over the ground with the power shaft 66 rotating. The downward air flow through the passage 32 is directed inwardly and downwardly all about the periphery of the shroud 14, and will pick macadamia nuts out of crevices and from between rocks and, in effect, float them in an air stream. The flow of air from the passage 32 tends to reflect upwardly from the ground near the center of the grill 44, and this upward air flow will carry the gathered macadamia nuts into the shroud 14, where they will be captured by the strong upward air flow generated by the upper blower fan 70 and the interior impeller blades 90. The gathered macadamia nuts and any debris passing through the openings in the grill 44 will then be passed out the discharge spout 26, collected, and taken away for further processing.

The present invention provides an effective harvester machine for use on macadamia nuts and other similarly located nuts, and fulfills the objects hereinabove set forth. Obviously, many modifications of the invention are possible.

I claim:

1. A harvesting machine for macadamia nuts, comprising:
   a shroud having an open bottom, and arranged to be mounted for movement across the ground;
   housing means mounted on said shroud, and including a discharge spout;
   blower means associated with said housing means, and operable for establishing an upward air flow through said shroud and out said discharge spout;
   annular director ring means mounted on the lower end of said shroud and extending substantially completely about the periphery thereof in annular spaced relationship;
   impeller means carried by said shroud, and operable for establishing an annular flow of air downwardly through the annular space between said detector ring and the lower end of said shroud, said impeller means and said director ring being arranged and cooperating with each other so that said annular flow extends substantially completely about the lower end of said shroud, and said director ring being arranged to direct said downwardly flowing air inwardly and downwardly beneath substantially the entire periphery of said shroud for dislodging macadamia nuts from crevices in the ground upon which said harvesting machine is operated, and said blower means being arranged to generate an upward air flow within said shroud sufficient to capture and ingest freed macademia nuts and discharge them through said discharge spout.

2. A harvesting machine as recited in claim 1, including additionally:
a grill mounted on the open bottom of said shroud, said grill having openings therein measuring slightly larger than the macademia nuts to be harvested.

3. A harvesting machine as recited in claim 1, wherein said blower means includes:
vertical shaft means carried by said shroud, and extending through said housing means;
a power unit connected with said shaft means, and operable to effect rotation thereof; and
a blower fan mounted on said shaft means and received within said housing.

4. A harvesting machine as recited in claim 3, wherein said housing means is generally spiral-shaped.

5. A harvesting machine as recited in claim 1, wherein said impeller means includes:
an annular mounting ring mounted for rotation within the lower end of said shroud; and
a plurality of blades mounted on the exterior of said mounting ring, said blades being positioned beneath the lower edge of said shroud and extending radially into the annular space between said director ring and said shroud, and being angled to generate a downward air flow simultaneously with the generation of an upward air flow by said blower means.

6. A harvesting machine as recited in claim 1, wherein said blower means and said impeller means are operated by a common power source, and wherein said impeller means generates a downward air flow through said annular space simultaneously with the generation of an upward air flow within said shroud by said blower means.

7. A harvesting machine for macademia nuts, comprising:
a shroud having an open bottom, and arranged to be mounted for movement across the ground;
housing means mounted centrally on top of said shroud, and including a discharge spout;
a vertical shaft mounted centrally within said shroud and extending through said housing means;
a blower fan mounted on the upper end of said shaft within said housing means, and arranged to generate an upward flow of air through said shroud and out said discharge spout when said vertical shaft is rotated in one direction;
means connected with said vertical shaft, operable to rotate said shaft in said one direction;
an annular director ring mounted on the lower end of said shroud and extending about the periphery thereof in spaced relationship, said director ring projecting downwardly from said shroud; and
impeller means mounted on said vertical shaft within said shroud below said blower fan, arranged and operable to generate a downward annular flow of air through the space between said director ring and said shroud, said director ring being arranged to direct said air flow downwardly and inwardly beneath the central portion of said shroud.

8. A harvesting machine as recited in claim 7, wherein said impeller means includes:
an annular mounting ring mounted on said shaft; and
a plurality of blades mounted on the exterior of said mounting ring, each of said external blades being positioned beneath said shroud and extending radially into said space between the detector ring and the shroud, and being pitched to generate a downward air flow through said annular space when said shaft is rotated in said one direction.

9. A harvesting machine as recited in claim 8, wherein additionally said mounting ring is provided with internal radial blades, arranged to generate an upward air flow through said shroud when said shaft is rotated in said one direction.

10. A harvesting machine as recited in claim 8, wherein said annular director ring has a skirt mounted to depend therefrom, said skirt being made of flexible material.

11. A harvesting machine as recited in claim 7, wherein a grill is mounted across the open bottom of said shroud, said grill having openings therein slightly larger in size than the macademia nuts to be harvested.

12. A harvesting machine for macademia nuts, comprising:
a shroud having an open bottom, and arranged to be mounted for movement across the ground;
housing means mounted on said shroud, and including a discharge spout;
blower means associated with said housing means, and operable for establishing an upward air flow through said shroud and out said discharge spout, said blower means including: vertical shaft means carried by said shroud and extending through said housing means; a power unit connected with said shaft means, and operable to effect rotation thereof; and a blower fan mounted on said shaft means and received within said housing;
annular director ring means mounted on the lower end of said shroud and extending about the periphery thereof in annular spaced relationship; and
impeller means carried by said shroud, and operable for establishing an annular flow of air downwardly through the annular space between said director ring and the lower end of said shroud, said director ring being arranged to direct said downwardly flowing air inwardly and downwardly beneath said shroud for dislodging macademia nuts from crevices in the ground upon which said harvesting machine is operated, and said blower means being arranged to generate an upward air flow within said shroud sufficient to capture and ingest freed macademia nuts and discharge them through said discharge spout, said impeller means comprising:
an annular mounting ring mounted on said shaft means below said blower fan; and
a plurality of blades mounted on the exterior of said mounting ring, said blades being positioned beneath the lower edge of said shroud and extending radially into the annular space between said director ring and said shroud, and being angled to generate a downward air flow simultaneously with the generation of an upward air flow by said blower fan.

13. A harvesting machine as recited in claim 12, wherein said blower means additionally includes:
a plurality of radial blades mounted within said mounting ring, and angled to generate an upward air flow simultaneously with the generation of a downward air flow by said externally mounted blades.

* * * * *